Figure 1:
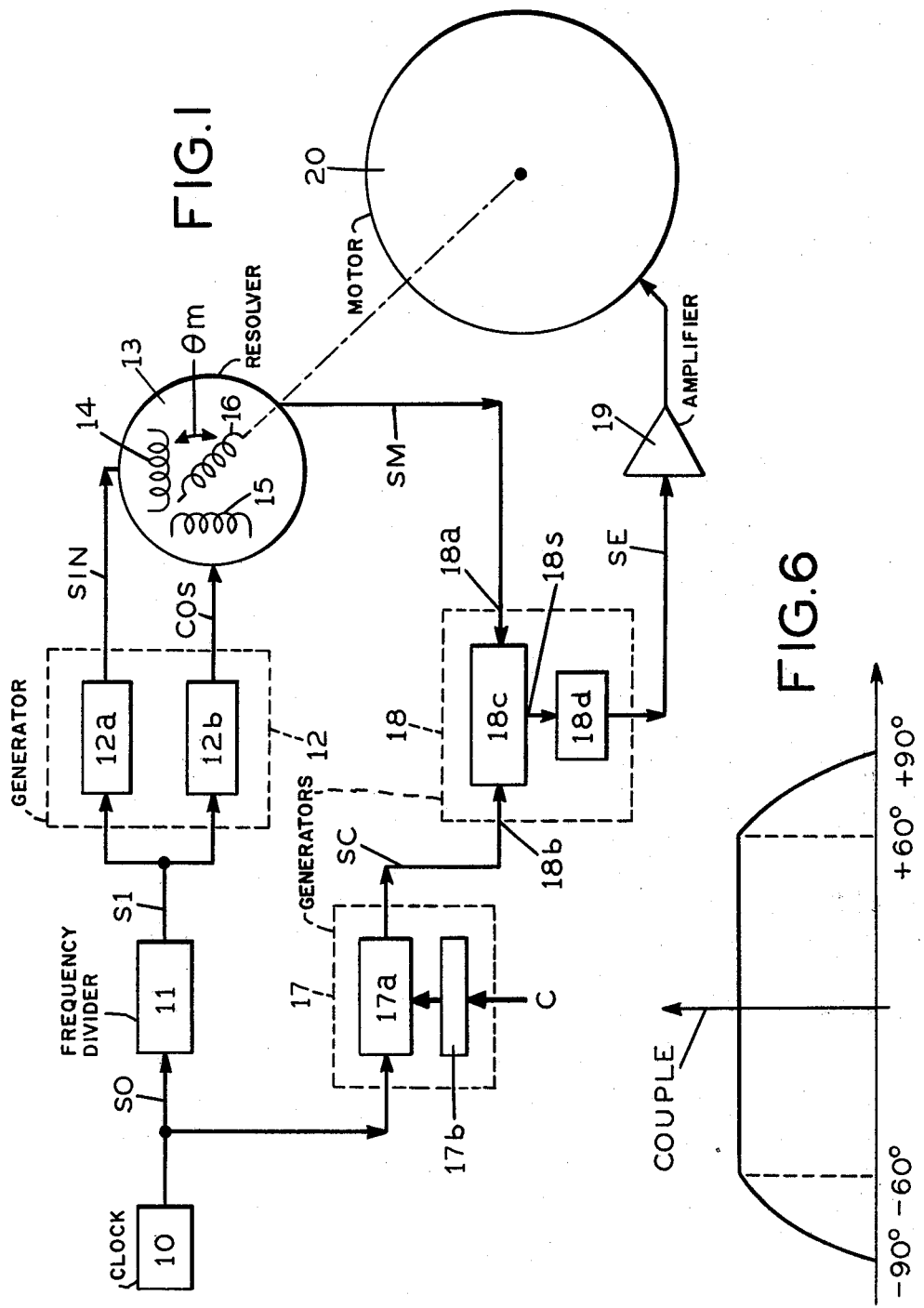

United States Patent [19]

Mulet-Marquis

[11] 4,310,790

[45] Jan. 12, 1982

[54] DEVICE FOR POSITION CONTROL

[75] Inventor: Yves Mulet-Marquis, Avrille, France

[73] Assignee: Kollmorgen Technologies Corporation, Dallas, Tex.

[21] Appl. No.: 78,946

[22] Filed: Sep. 26, 1979

[30] Foreign Application Priority Data

Oct. 5, 1978 [FR] France ................................ 7828539

[51] Int. Cl.³ .............................................. G05B 1/01
[52] U.S. Cl. .................................... 318/608; 318/661; 340/825.2
[58] Field of Search .............................. 318/608, 661; 340/147 MT, 147 SY

[56] References Cited

U.S. PATENT DOCUMENTS

| | | | |
|---|---|---|---|
| 3,227,863 | 1/1966 | Windsor | 318/608 |
| 4,023,085 | 5/1977 | Bishop et al. | 318/661 |
| 4,134,106 | 1/1979 | Hungerford | 318/661 X |
| 4,204,257 | 5/1980 | Hungerford | 318/661 X |

*Primary Examiner*—B. Dobeck

*Attorney, Agent, or Firm*—Morgan, Finnegan, Pine, Foley & Lee

[57] ABSTRACT

A device for position control including a first generator for delivering first and second identical signals dephased to each other by 90°. A position pickup having two inputs connected to the first and second signals and an output for delivering a measurement signal whose phase is representative of the actual angular position of the component part to be controlled. A second generator for receiving a digital binary word instruction and for delivering an instructional signal of the same frequency as the first and second signals and having a phase representative of the desired angular position of the component part. A deviation signal generator connected to the output of the angular position pickup and the second generator for delivering a deviation signal representative of the dephasing between the measurement and instruction signals and a control device for controlling the angular position of the component as a function of the deviation signal.

4 Claims, 12 Drawing Figures

DEVICE FOR POSITION CONTROL

This invention concerns a device for position control, in particular, one for controlling the angular position of a component part.

It is common practice that the position-control data of a regulating component are processed in digital form. The processing of digital data affords the advantages of accuracy and stability, in comparison with analog signals.

It is therefore desirable to have a control device which can take digital instruction data into account directly, without passing through analog conversion. More generally, it is desirable to carry out the greater part of the signal processing by the digital method.

With this aim in mind it has been proposed, In U.S. Pat. No. 3,227,863, to create a control device of the type comprising:

A first generator delivering a first and second signal which are identical, dephased with respect to each other by 90°;

An angular position pickup of the resolver type, having a rotor coupled to a component whose angular position is to be controlled, two inputs linked to the first generator to receive the first and second signal, respectively, and an output delivering a measurement signal whose phase is representative of the actual angular position of said component;

A second generator receiving a digital instruction message in the form of a binary word, and delivering an instruction signal of the same frequency as the first and second signal, and having a phase representing the desired angular position of said component;

A generator of a deviation signal linked to the output of the pickup, and to the second generator, in order to deliver a deviation signal representative of the difference in phase between the measurement signal and the instruction signal, and A control device to control the angular position of said component as a function of the deviation signal.

In this known control device, rectangular signals, derived from a clock by division of frequency, are applied directly to the resolver. The result of this is a high rate of harmonics in the measurement signal, to the point that it is necessary to filter it before it is used.

It is known that there are no perfect low-pass cutoff filters providing a total and sharp cutoff, and which cause no dephasing up to the cutoff frequency. The necessary result of this is that the phase of the measurement signal is affected by the dephasing of the filter, said dephasing being particularly unstable, especially as a function of the temperature. The gain in precision and in stability expected as a result of performing part of the signal processing by the digital method and the gain in precision sought by the filtering, are thus to a large extent voided by the disturbance introduced by the filter.

The aim of the invention is therefore to create a control device in which the processing of the signal is accomplished to a large extent by the digital method, without the consequent necessity of providing a filtering of the measurement signal in order to achieve a proper operation of this signal.

This aim is achieved by a control device of the type defined hereinafter, in which, according to the invention;

Each of the first and second signals generated by the first generator is a digital approximation of a sinusoidal signal by being composed of alternations, each consisting of several stages, so as to provide a reduced rate of harmonics, and The generator of the deviation signal compares the phase of the unfiltered output signal from the pickup directly with the phase of the instruction signal.

According to one particular feature of the control device according to the invention, the deviation signal generator comprises a synchronous demodulator which receives a control signal of the same frequency as that of the instruction signal, in phase with the latter, and made up of rectangular pulses of duration equal to half their cycle, so that, in the course of successive half-cycles of the control signal, there will be caused to pass from a positive value to the opposite negative value, the gain between an input from the demodulator receiving the measurement signal and an output from the demodulator linked to the output of the generator of the deviation signal.

The deviation signal can then be produced by taking the average value of the signal furnished at the output of the demodulator.

Figure 2:
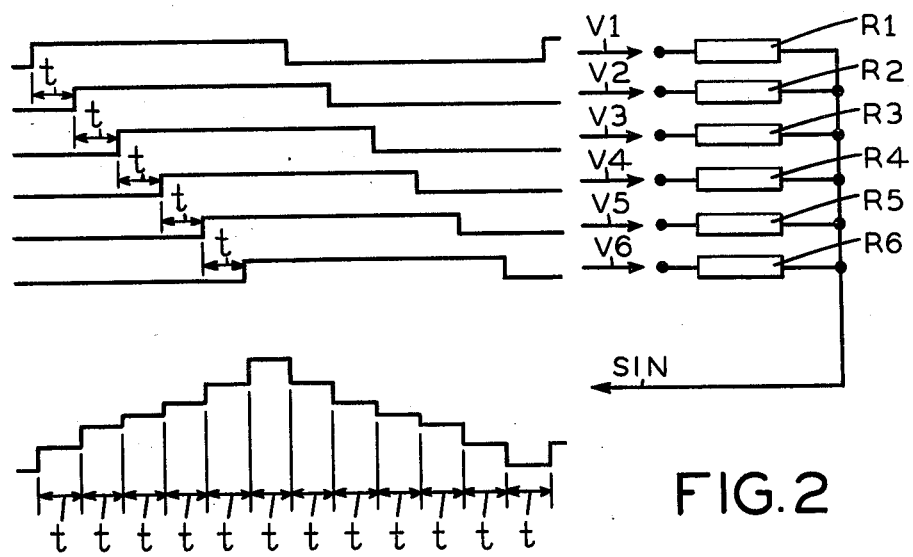
Figure 5:
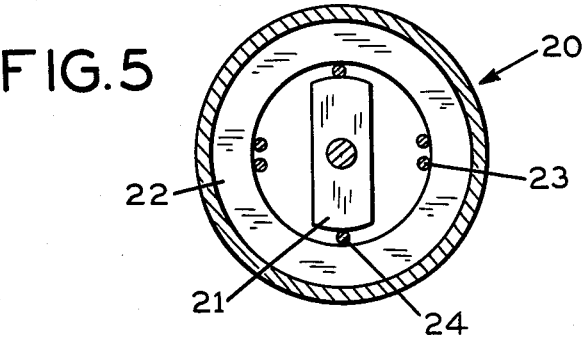
Figure 4:
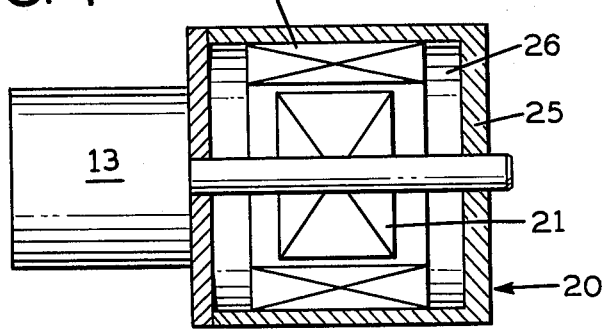

Other particular features and advantages of the device according to the invention will be evident from reading the description of a particular embodiment of this device, the description given hereinafter by way of illustration but without limitation thereto, with reference to the attached drawings which show:

FIG. 1: A block diagram of an embodiment of a control device according to the invention;

FIG. 2: A diagram of an embodiment of a generator circuit of the device in FIG. 1;

FIGS. 3A to 3G; Diagrams of signals furnished by the circuits of the device shown in FIG. 1;

FIGS. 4 and 5; Two very schematic views of longitudinal section and cross section of the mounting of the device for which the diagram is given in FIG. 1; and FIG. 6; A view of the curve illustrating the variations of couple of the control motor of the mounting illustrated in FIG. 5, as a function of the angular position of the rotor of that motor.

The device illustrated by the diagram of FIG. 1 comprises a clock 10, a frequency divider 11 receiving the pulses from the clock 10, a generator 12 receiving the output signal from divider 11 and comprising two circuits 12a, and 12b, delivering a SIN (sine) signal and a COS (cosine) signal, dephased with respect to each other by 90°. The SIN and COS signals are applied to the stator windings 14 and 15 of a resolver 13. The rotor of the resolver 13 is integral in rotation with a component whose angular position around its axis 21 is to be controlled. A measurement signal SM, whose phase is representative of the angular position of said component, is furnished at the terminals of the output winding of the resolver, and is applied to an input 18a of a generator 18 of the deviation signal SE. The other input 18b of the generator 18 receives an instruction signal SC whose phase is representative of the desired angular position of said component, and which is delivered by a generator 17 to which are applied the pulses from clock 10. A generator 17 receives the instruction data (desired angular position) in digital from (binary word C). The deviation signal furnished at the output of generator 18 is amplified by an amplifier 19, in order to actuate a motor 20 which controls the displacement of said component to cause its actual angular position to coincide with the desired angular position.

The control device and its functioning will be described hereinafter in more detail. Reference will be made to the FIGS. 1, 2 and 3A to 3G.

Figure 3A:
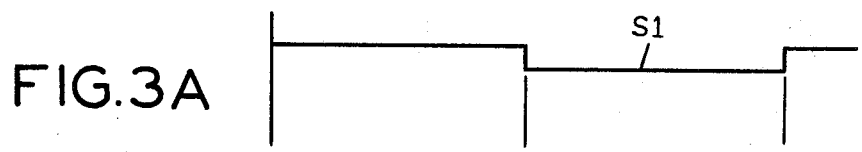
Figure 3B:
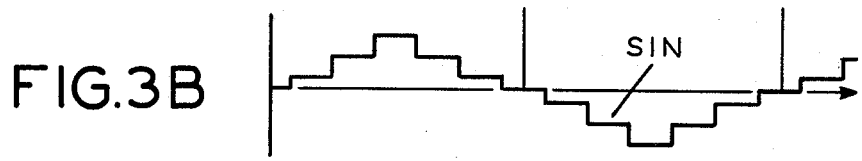
Figure 3C:
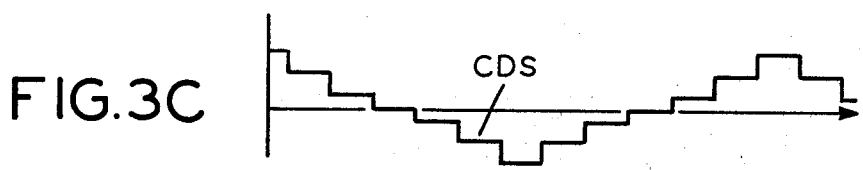
Figure 3D:
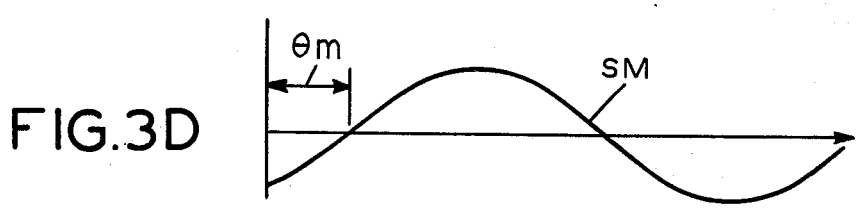

Clock 10 is a quartz-stabilized high-frequency generator which delivers a signal SO applied to divider 11. The latter furnishes a signal S1 at frequency F1 (FIG. 3A).

Circuit 12a of generator 12 comprises in a way known in itself, a network of resistors R1 to R6, which have a common point forming the output of circuit 12a where signal SIN appears. The other terminals of resistors R1 to R6 receive signals V1 to V6 (FIG. 2), respectively, obtained from signal S1. Signals S1 and V1 to V6 are displaced from each other by a duration t.

The SIN signal obtained (FIGS. 2 and 3B) is a signal of sinusoidal speed, of frequency F1, and of which each alternation is made up of several steps. In the example illustrated, a double alternation is formed from 12 different stages because a set of six resistors is used. The duration is then equal to 1/12 of the cycle of signal S1. Since the signal S1 is used as phase reference, the signal V1 is retarded by 19t/2 with respect to the signal S1, so that the signals S1 and SIN will be in phase.

The values of the resistances are determined by conferring upon the different stages heights such that the form of the signal will at best approach that of a sinusoidal signal. The rate of harmonics contained in the SIN signal can be very low. In general, if 2p is the number of stages used to form a double alterance, only the harmonics of the rank K (2−) +1 can subsist, k being a whole number.

Circuit 12b, analogous to circuit 12a, generates the COS signal (FIG. 3C) which corresponds to the SIN signal, shifted by 90°.

The signal SM (FIG. 3D) at the output of the resolver 13, used in dephaser, is dephased with respect to the SIN signal by a magnitude of $\theta m$, representative of the mechanical angle of the resolver rotor.

Figure 3E:
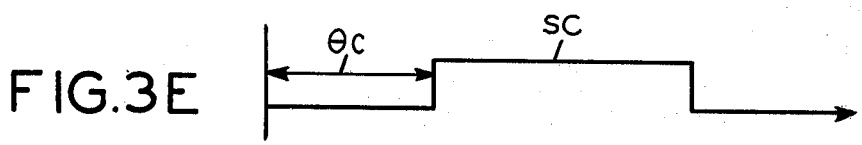
Figure 3F:
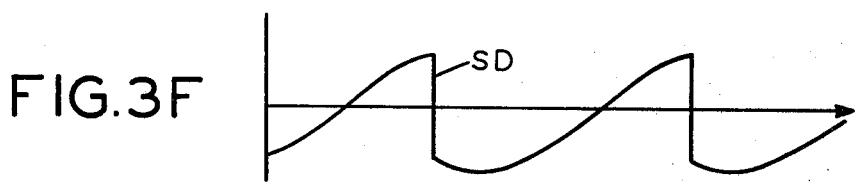

Generator 17 comprises a counter-decounter 17a whose capacity is determined so that the pulses from clock H will cause it to fulfill successive cycles of counting (or decounting) at the frequency F1. The counter-decounter 17a forms the frequency divider and delivers the signal SC at frequency F1 (FIG. 3E). The dephasing $\theta_c$ between the signal SC and signal S1 is determined by initial pre-setting of the counter-decounter at a value corresponding to the binary word C. The latter is, for example, stored in a register 17b connected to counter-decounter 17a.

Signal SC is formed by rectangular pulses of duration equal to half their cycle, and it is applied to the generator 18.

Generator 18 comprises a demodulator 18c whose gain, between its input 18a receiving the signal SM, and its output 18s delivering a signal SD (FIG. 3F), passes alternately from a positive value to the opposite negative value (from +1 to −1, for example), in the course of successive half-cycles of signal SC which constitutes the control signal from the demodulator.

Figure 3G:

A circuit 18d receives the signal SD, determines its mean value and delivers the deviation signal SE in the form of a continuous signal whose amplitude is equal or proportional to that mean value (FIG. 3G). It is in effect apparent that the difference between the dephasing $\theta_m$ and $\theta_c$ is proportional to the mean value of the signal SD.

The low rate of harmonics contained in the signals SIN and COS, and by way of consequence, in the signal SM, makes it possible to compare the phase of the latter signal with the instruction signal SC without prior filtering likely to introduce parasite dephasings.

In addition, the use of transformer resolver, revolving as a position pickup, eliminates the necessity of using a sliding or rotating electric contact likely to decrease the reliability of the system.

This reliability is further increased by using a DC motor oscillating without brushes with limited angular clearance (for example 60° on either side from a central position).

The motor rotor consists of a permanent magnet 21 (FIGS. 4, 5) and the stator 22 is a core of ferro-magnetic material on which there are wound conductors 23, 24 in which the currents flow in opposite directions.

Such a motor can present a characteristic coupling curve such as the one in FIG. 6. The clearance of +60° is sufficient in numerous applications, in particular, for example, in order to control the angular positions of a cam.

The resolver 13 is mounted on the housing 25 of motor 20, the protruding shaft of the resolver being prolonged in order to form the shaft of the motor. Thus, any lack of precision resulting from a coupling likely to produce play is eliminated.

A case 26 on which the stator 22 rests contains the electronic components of the control device.

Naturally, various modifications or additions can be made with respect to the embodiment described above of a control device according to the invention, without departing from the scope of protection defined by the attached claims.

I claim:

1. A control device comprising:
   a first generator delivering a first and second identical signals, dephased with respect to each other by 90°;
   an angular position pickup of the resolver type, having a rotor coupled to a component part whose angular position is to be controlled, said positioning pickup having two inputs connected to said first generator for receiving said first and second signals, respectively, and an output for delivering a measurement signal whose phase is representative of the actual angular position of said component;
   a second generator for receiving a digital instruction message in the form of a binary word and for delivering an instruction signal of the same frequency as the first and second signals and having a phase representative of the desired angular position of said component;
   a deviation signal generator connected to the output of said angular position pickup and to said second generator for delivering a deviation signal representative of the dephasing between the measurement signal and the instruction signal, said deviation signal generator comprises a synchronous demodulator for receiving a control signal of frequency equal to that of said instruction signal and in phase with the latter, and made up of rectangular pulses of duration equal to one-half of their cycle, so that, in the course of successive half-cycles of the control signal, the gain between an input of the demodulator receiving the measurement signal and an output of the demodulator linked to the output of the deviation signal generator will pass from a positive value to the opposite negative value; and a control device for controlling the angular position of said component as a function of the deviation signal, characterized by the fact that;

each one of said first and second signals generated by said first generator is a digital approximation of a sinusoidal signal consisting of alternating cycles, each alternating cycle comprising several stages for producing a reduced rate of harmonics, said deviation signal generator compares directly the phase of the unfiltered output signal from said pickup with the phase of said instruction signal.

2. A device according to claim 1, including means for delivering said deviation signal in the form of a signal representative of the mean value of the output signal from the demodulator.

3. A device according to claim 1, in which said pickup of the resolver type and said component part whose angular position is to be controlled include a common shaft.

4. A device according to claim 1 or 3, in which said component part includes a DC motor, oscillating, without brushes, and with limited angular clearance.

* * * * *